United States Patent [19]

Lawsine

[11] Patent Number: 5,506,582
[45] Date of Patent: Apr. 9, 1996

[54] SIGNAL PROCESSING APPARATUS

[76] Inventor: Leo Lawsine, 10007 Todd Mill Rd. SE., Huntsville, Ala. 35803

[21] Appl. No.: 3,492

[22] Filed: Jan. 15, 1979

[51] Int. Cl.⁶ ........................................................ G01S 7/38
[52] U.S. Cl. ................................................................ 342/15
[58] Field of Search ............................ 343/18 E; 342/13, 342/14, 15

[56] References Cited

U.S. PATENT DOCUMENTS 3,720,952  3/1973  Lawsine ..................................... 342/15

Primary Examiner—Daniel T. Pihulic
Attorney, Agent, or Firm—& Laubscher Laubscher

[57] ABSTRACT

A signal processing system is disclosed in which detected signals received from an antenna are mixed with computer-controlled first local oscillator signals, delayed, mixed with computer-controlled second oscillator signals, and retransmitted toward the hostile radar installation, characterized in that the delay is effected by a combined computer and microprocessor operation acting on the detected and mixed signal, the delayed signal being supplied to the signal transmitting branch via an IF gate that is operable by a computer-controlled microprocessor. The computer—which controls the operation of the local oscillators, the crossed field amplifiers, the tuned mixers, the delay switching system, the doppler correcting means, the core memory, and the microprocessor—is responsive to an amplified signal from the first mixer that is supplied to the computer via a pulse width and rate interval detector, and via a frequency discriminator that provides a reference frequency signal.

5 Claims, 3 Drawing Sheets

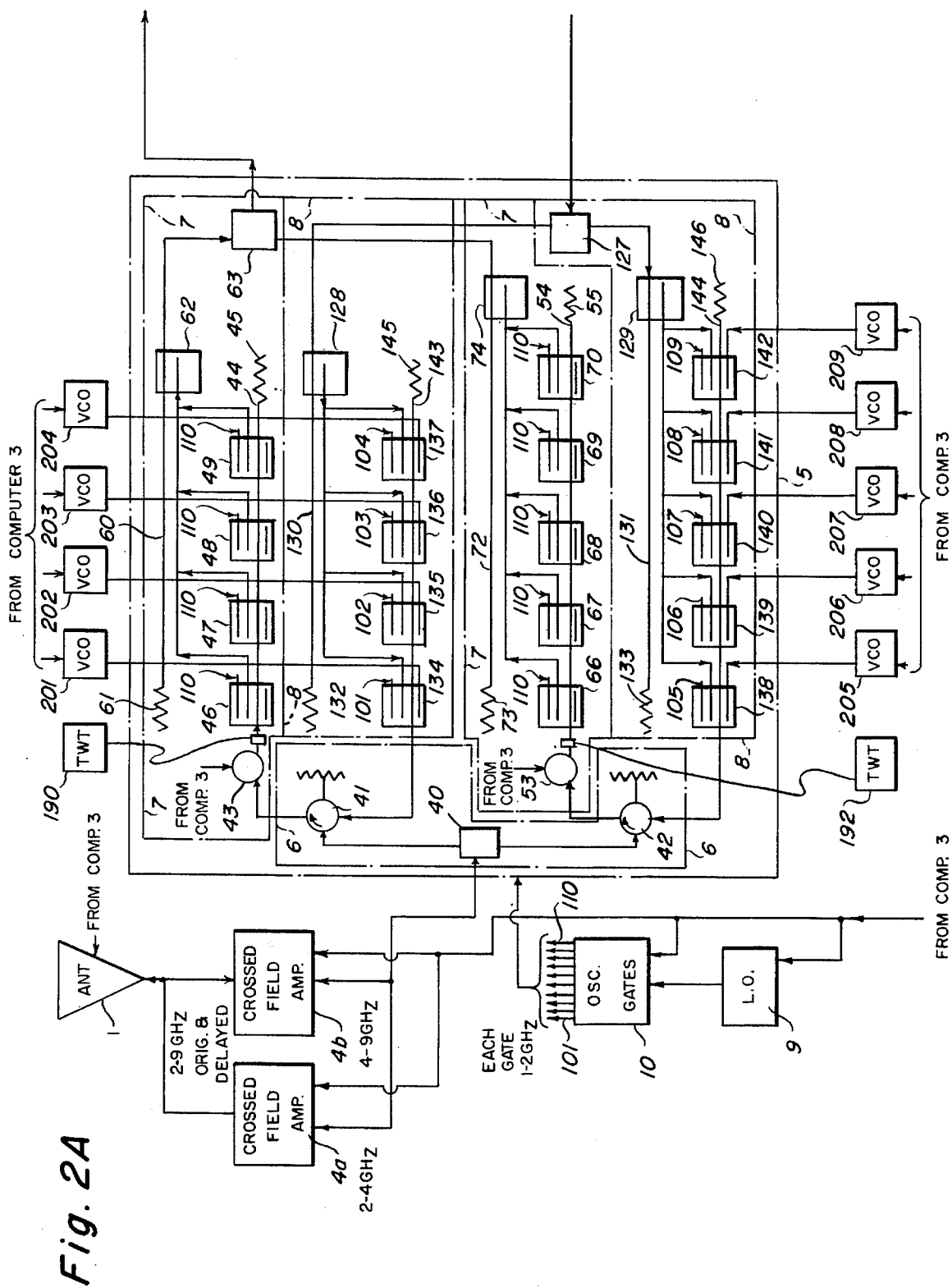

SIGNAL PROCESSING APPARATUS

BRIEF DESCRIPTION OF THE PRIOR ART

In my prior U.S. Pat. No. 3,720,952, a signal processing system is disclosed for processing the aircraft and spacecraft-seeking signals of one or more hostile radar installations and for repeating to those installations false target echo signals of corresponding frequency. The prior countermeasure system—which is instrumented to perform, in real time, all the important deception repeater jamming operations—is operable to repeat pulse or continuous wave signals against anywhere from one to one hundred hostile radars operating in either the search or track mode. The system performs also against radars provided with electronic counter-countermeasure means, such as frequency diversity, frequency jumping, and random, staggered, jittered or coded pulse repetition rate frequencies. In the known system, use is made of programmed computer control means operable in response to the specific characteristics of the hostile radar signal to repeat either earlier or later in time the true target echo, whereby the repeated echo appears at a shorter or longer range on a radar display (or as recorded on a data processor). Furthermore, doppler correction means are provided that supply a doppler frequency correction to compensate for different simulated vehicle speeds in correlation with the repeated echo. The system, which repeats a signal based on the characteristics of the received signal, is programmed to change the time of retransmission, the time base (i.e., compress or expand the time frame) or to communicate between a number of systems. In the electronic countermeasure mode of operation, all of the operational features are correlated in terms of time, frequency and phase. The system is also applicable for use in the communication mode as a link in communication satellite network, for example.

SUMMARY OF THE INVENTION

The present invention relates to an improved system for processing aircraft, satellite and spacecraft-seeking signals and for repeating to the hostile radar installations false target echo signals. This new technique is also applicable to repeating all forms of communications signals. The improved system is particularly flexible and reliable for all anticipated RF (radio and radar) scenarios (involving high density radar threats) because of the nanosecond switching capabilities of the computer and microprocessor systems that characterize the invention.

Accordingly, a primary object of the present invention is to provide a signal processing system including a unique microwave front end and selectively operable computer-controlled delay means through which the detected and mixed signal is fed, which delayed signal is supplied to the signal transmitting branch of the system via an IF gate device that is also controlled by the computer. The computer, in turn, is responsive to an amplified signal from the first balanced mixer that is supplied to the computer via a pulse width and pulse rate interval detector, and via a frequency discriminator that provides a reference frequency signal.

According to a further object, the transmitting directional filter mixer units of the microwave front end are supplied with control signals from voltage controlled oscillators that in turn are controlled by the computer. Voltage controlled oscillators may also be used in the receiving directional filter mixer units to improve performance.

The operation of the overall system is concerned with the reception, processing and retransmission of complex signals for RF scenarios which include ECM-ECCM (Electronic Counter Measure-Electronic Counter Counter Measure) tactics, satellite deception repeating, and the repeating of all anticipated forms of communications signals.

The scenario for a typical tactical mission consists of electronic counter-countermeasure RF emitters radiating in the forward hemisphere (i.e., the volume of space in front of the aircraft and measured down in elevation) two or more RF frequencies varying as a function of time and also with other varying parameters—e.g., PRF (Pulse Repetition Frequency), PW (Pulse Width), scan rate, radar power, relative strength of main and side lobes, and the like. Completing the scenario is a vehicle with ECM for which the varying parameters are altitude, angle (azimuth, elevation), slant range, speed of the vehicle/pulse doppler, target cross section.

During the tactical mission, as the vehicle with the ECM deception Jamming system approaches the ECCM (hostile) radar, an analysis is automatically and continuously made at the ECM jammer vehicle of all program inputs. Such information and data is partially derived from ancillary equipment in the vehicle (real time) and partly from intelligence (non-real time) supplied prior to the mission and stored in the computer, microprocessor and core memory. Prior to vehicle takeoff, the ground (ECM) crew selects a predetermined program (non-real time) that supplements the new factors as they develop. Decision time and associated processing time takes place in the order of microseconds.

The time of first interception occurs when the vehicle receives signal pulses or CW (Continuous Waves) assumed to be above the ECM receiver apparatus threshold. These radar signals may be in the search, acquisition, or tracking modes or in a mix of the three modes. The ECM system processes the signals and retransmits (repeats) during real time false target echoes in range, speed and angle. The false echo received by the hostile radar appears at least as strong as the expected target echo (since the ECM system operates as a one-way transmitter as distinguished from the two-way reflection radar system).

The deception repeater system has the data processing capability to repeat the radar signal earlier or later or to jitter the signal around a cover or other pulse. There, the earlier signal appears at shorter range than the expected target, the later signal at longer range, and the Jammer jitter puts false echoes at both shorter and longer ranges than the cover or other pulse. The complexity of the pattern of repeated pulses depends on the sophistication of the ECCM radar—e.g., frequency diversity, frequency jumping, chirp, random/staggered/jittered or coded pulse PRF's, and the like.

Futhermore, the ECM generates a doppler frequency shift on the false echo signal. This shift corresponds to the higher or lower speed of the false target echo which is closing range faster or slower than the skin echo. This doppler shift either up or down may be achieved for speeds ranging from a few miles per hour to speeds on the order of Mach 5 or greater. Serrodyning techniques are usually used for this purpose.

The false range echo deceives the radar generally by stealing its range gate. This technique is called RGPO (Range-Gate-Pull-Off). The false doppler shift generally affects the radar's frequency tracking gates (doppler filters). This technique is called SGPO (Speed-Gate-Pull-Off). Since there is no FM for range in false doppler, the jammer can steal the velocity gate easily, since doppler radar only tracks a filter bank.

The deception repeater signal may be programmed to come down a sidelobe of the radar beam or to have a deliberately distorted phase front. The signal will then be false in angle for search, acquisition and tracking modes. Angle distortion can be accomplished by "cross-eyes" techniques (e.g., phase front distortion with FM modulation of source scatterers, and by developing grating lobes with phased arrays (as will be apparent to those skilled in the art). Even sophisticated monopulse tracking radars could be deceived into tracking the error signal.

The system is capable of automatically and continuously repeating against 100 or more pulse radars. There is also reserve capacity to handle 5 or more CW radars provided they are not colocated with other radars. Realistically, 10 or more CW radars can be handled if no pulse radars are present. The system capabilities are adequate to receive, process, and retransmit the required number of pulses and CW to support the above figures. Such capabilities depend on computer and microprocessor capacity, duty cycle, signal characteristics, electronic countermeasure techniques, RF scenarios, and tactical operation.

The operational capabilities are achieved by automatic processing of the spectral components of the radar signal. Such frequency domain operation utilizes unique techniques to control frequency and pulse transmission instantly and automatically. To this end, the frequency components are filled in or reinserted as directed by the computer program and microprocessors.

The figure "100" radars is Justified by a review of typical threat scenarios involving a mix of search, acquisition, and tracking radars. For example, 25 search radars each illuminating the jammer antenna with 8 pulses per second accounts (considering scan time) for 20 pulses per second; 25 acquisition radars at 25 pulses per second (each) accounts for 625 pulses per second; 50 tracking radars at 1000 pulses per second (each) accounts for 50,000 pulses per second. Current computer and microprocessor techniques together with the unique frequency domain techniques of this invention can handle the "pulse rate" load.

Justification for handling CW radars is based on an assumed 10 microsecond look-through for CW every 0.1 second. The look-through update is to determine if CW is turned off or that other radars may be on. The microprocessor is already programmed for a steady on mate (i.e., no gate) until look-through, then the intermediate frequency gate turns the CW off. CW operation lowers jammer efficiency for CW.

BRIEF DESCRIPTION OF THE DRAWING

Other objects and advantages of the invention will become apparent from a study of the following specification when considered in conjunction with the accompanying drawing, in which:

FIGS. 1 and 2A, 2B are simplified and detailed illustrations, respectively, in block diagram form, of the wide band electronic countermeasure deception repeater jammer system of the present invention.

DETAILED DESCRIPTION

Figure 1:
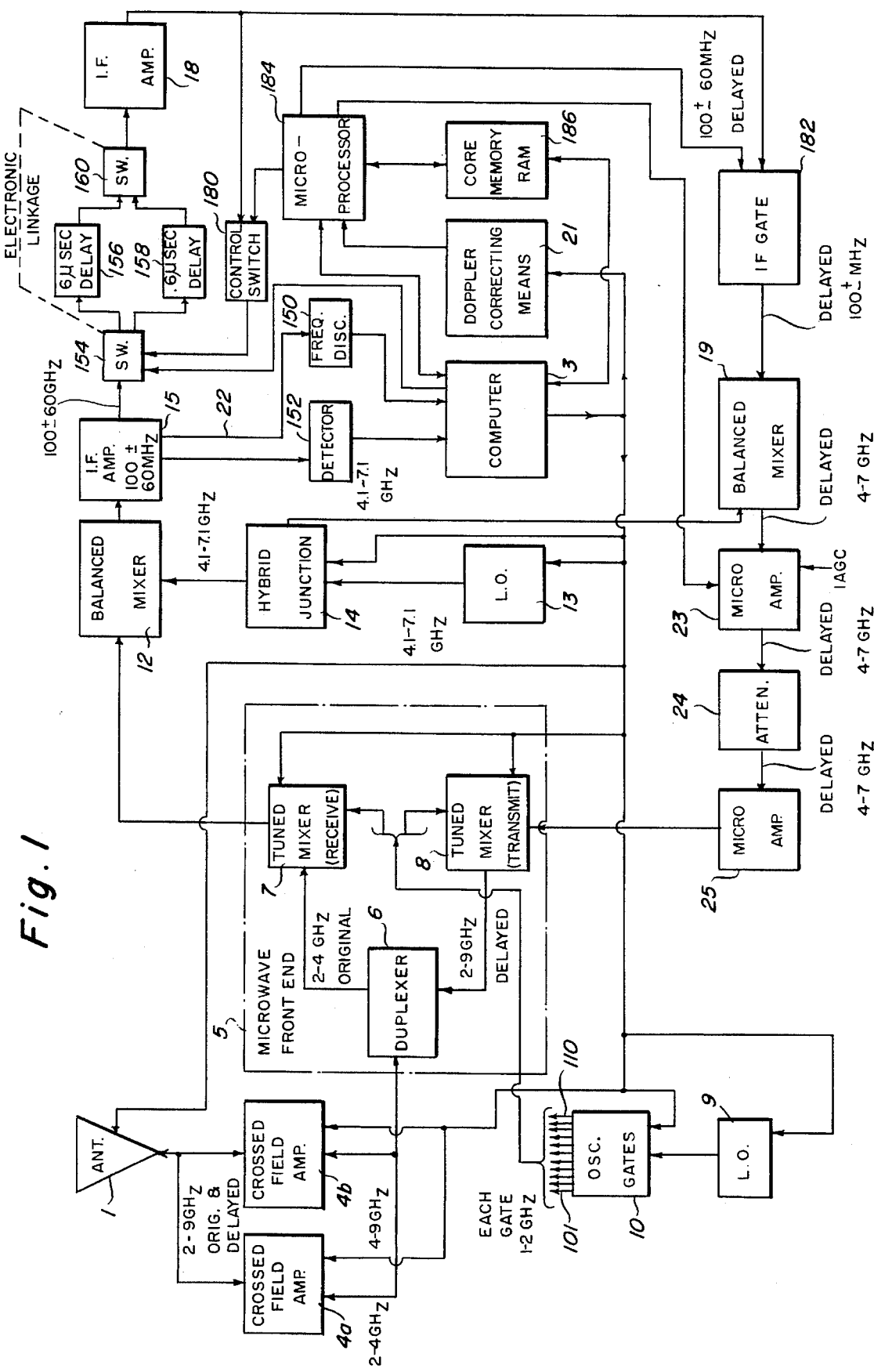

Referring first to FIG. 1, antenna 1 may be wide band, equiangular (or logarithmic) spiral type broadband over two or more octaves. Such antennas are particularly suitable for high speed airborne and space vehicles. Commonly, the U. S. Navy and Air Force have accepted several antenna types for their aircraft. These include stubs (vertical and horizontal polarization stubs), spirals (circular polarization), horns (circular polarization), and Luneburg lens (circular polarization). A compatible antenna system with this ECM apparatus could include a combination of stubs and Luneburg lens antennas. This design would use the stubs For retransmission only, and the Luneburg lens (with pickups) for gross detection and accurate location.

Antenna operation is controlled by computer 3 and associated microprocessors to perform several functions as will be described in greater detail below. Depending on the antenna type, an effective area (up to 180° solid angle ), for example, may be observed from the underside of an aircraft wing during reception. During this phase, a target can be accurately located, and within nanoseconds, the signal can be retransmitted to the selected target. For radar search, acquisition, and track, the system of the present invention will receive, process, and repeat RF pulses or CW in the range covering the microwave bands generally used by radars. In describing system operation, a typical signal range from 2–9 gigahertz (GHz) has been selected for convenience in analysis. An extension of this signal range from 300 MHz to 18 GHz could be easily implemented by a replication of several component types and an addition to the computer program; the analysis would remain unchanged.

During reception (i.e., the scanning period) the radar signal passes through CFA (Crossed Field Amplifier) 4a and 4b which serves as a passive low loss device (0.5 to 1.5 decibels) in the receive direction. Crossed field amplifiers generate 15 KW peak power in the 2–4 GHz range, and 8 KW in the 4–9 GHz range; power gains are 12 dB in the 2–4 GHz range and 15 dB in the 4–9 GHz range; bandwidths cover two octaves (e.g., 2–9 GHz), thus two crossed field amplifiers are needed to implement the present invention. Alternative circuits with wideband TWT's (Traveling Wave Tubes) are also feasible in place of CFA's; however, other considerations might preclude their use.

Computer 3 selects CFA 4a if the signal is within 2–4 GHz, or CFA 4b if the signal is within 4–9 GHz. The signal enters microwave front end 5 where it is separated by duplexer 6 into two or more paths. In this case it is fed into tuned microwave mixer set 7. During retransmission (i.e., repeating) the signal is passed from tuned mixer 8 into duplexer 6. Tuned mixer set 7 contains two nanosecond switches, two TWT amplifiers, nine tuned directional filter mixers, two directional filters, and a diplexer. Tuned mixer set 8 contains nine tuned directional filter mixers, nine VCO's, two directional filters, and a diplexer.

In the illustrated embodiment, set 7 encompasses the band 2–9 GHz during reception, and set 8 encompasses 2–9 GHz during retransmission. The processing of the signals in the 2–4 GHz range during reception is identical with that in the 4–9 GHz range.

Local oscillator 9, which is also controlled by computer 3, generates signals in the 1–2 GHz range that are applied to the oscillator gate means 10. Alternatively, LO 9 may be one or more single frequency oscillators electronically connected to produce the required sum and difference frequency components for IF (Intermediate Frequency) processing. The analysis using a band of LO frequencies or single frequencies would remain unchanged. The local oscillator 9 may be a carcinotron operating as a voltage tuned backward wave oscillator, or a travelling wave tube with regeneration. The local oscillator frequencies (in the 1–2 GHz range) may be obtained by modulating the carcinotron solely with white Gaussian noise at a high frequency rate, for example, in the range 10 to 30 megahertz. This technique effectively fills in "frequency holes" that might result from the use of Gaussian noise alone. The oscillator frequency spectrum then contains all frequencies over the band 1–2 GHz. The "spread spectrum" oscillator technique was previously used in the AN/APS-27. In the illustrated embodiment, the local oscillator gate means comprise solid state avalanche diode switches controlled by the computer 3.

In the present invention, signals in the 2–9 GHz range are analyzed with an LO band of 1–2 GHz. If signal frequencies in the range 10–18 GHz are anticipated, it will be necessary to provide an additional LO band or single frequencies. Also, this extension of signal frequencies will require antennas in that frequency range.

The output signal from the tuned microwave mixer set 7, which represents the sum and difference frequency components, is filtered through unit 7 (which passes spectral components in the range 4–7 GHz) and is applied to balanced mixer 12. The 4–7 GHz spectral components in each directional filter mixer may be combined with a VCO signal (one VCO for each mixer). Each VCO is then set at a frequency determined by the RF input signal, the IF spectral component range, and circuit selectivity properties. VCO application to the receiving directional filter mixers could improve performance, but it is a refinement not necessary for the analysis. The input to mixer 12 is on the order of –65 dB.

The output from the microwave front end is applied to unit 12 for mixing with a signal supplied by computer controlled local oscillator 13 via hybrid junction 14 as programmed by the computer. The LO frequency band covers the range of 4.1–7.1 GHz. The output signal from mixer 12 is amplified by the broadband IF amplifier 15 at 100±60 MHz bandwidth. The spectral components of the original signal are contained within the IF signal. Selection of the IF bandwidth is based on the smallest anticipated time delay inherent in the system (on the order of 0.05 to 0.1 microseconds). The local oscillators 9 and 13 may timeshare a single LO component controlled by computer 3.

The output of IF amplifier 15 is routed to three places: frequency discriminator 150, detector 152, and switch 154. Discriminator 150 produces the reference frequency to computer 3. Detector 152 supplies the PW and PRI to the computer. Switch 154 is controlled by computer 3 according to PW and switches the IF output to delay line 156 or 158 depending on PW (on first scan switch 154 is not activated). Delay line 156 (6 microseconds) is used for PW greater that 0.5 microsecond; delay line 158 (0.6 microseconds) is used for PW less than 0.5 microsecond. These delay lines prevent overlapping of the jittered pulses. Since tracking pulses are usually 0.5 microsecond or less, the jittered pulse should be at least 0.1 microsecond. The delay line outputs are properly terminated in switch 160 which is electronically linked with switch 154. The proper termination for both delay lines will, therefore, keep access time short—i.e., to nanosecond time. The switches are solid state avalanche diodes.

The output of switch 160 is directed to IF amplifier 18 which supplies outputs to recycling control switch 180 and to IF gate 182. Switch 180 directs the IF output to switch 154 and the delay lines 156 and 158 for recycling the IF pulsed signal. This loop is interrupted by microprocessor 184 which opens control switch 180 and thus controls the amount of jitter which is required to circumvent the hostile radar (prior to and after the cover pulse). The other output of unit 18 is supplied to IF gate 182 which is controlled by microprocessor 184 to produce anticipated target-like pulses prior to (i.e., earlier than) the cover pulse, and target pulses at and beyond (i.e., later) the cover pulse. The earlier pulses are determined by scan time and PRI considerations. Consequently, a received signal with chirp and/or random jitter, staggered or coded PRF will be processed in such a manner that the repeated signal will appear as a "valid" target return to the hostile radar. The microprocessor is generally of a type similar to Motorola Microprocessing Unit Model No. MC6800, although other microprocessors could be used as well.

The repeated (gated and delayed) IF broadband signal at 100±60 MHz is applied to one input of the second balanced mixer 19. It is mixed with the 4.1 to 7.1 GHz signal supplied by LO 13 via hybrid junction 14 as controlled by computer 3. The reconverted output of mixer 19, having a typical level of –65 dB is now a broadband signal with 4–7 GHz spectral components. This signal is amplified by microwave amplifier 23 (e.g., a TWT) and appears as an approximately –40 dB signal level that is attenuated by attenuator 24 which supplies an adequate input level to microwave amplifier 25 (e.g., a TWT). This latter amplifier brings the output signal to a level suitable for processing by the microwave front end means 5. Instantaneous automatic gain control (IAGC) may be supplied to microwave amplifier 23 to prevent ring around effects.

The doppler correcting means 21 is conventional in the art and includes a variable speed means, a servo amplifier means, a motor, a generator, a differential generator, and an attenuator. Unit 21 generates a doppler frequency shift (for the repeated pulses) which is correlated by microprocessor 184 with data on anticipated PRF, vehicle speed, and tactical considerations stored in core memory 186 (e.g., Motorola MCM 6810 Random Access Memory (RAM). In this respect, the range of corrections applicable on doppler frequency shifts will vary from 1000 Hz to 100,000 Hz or higher to cover a range of speeds from 80 miles per hour to Mach 13 or higher. The microprocessor 184 uses the data received from doppler correcting unit 21 and core memory 186 to develop the false doppler shift by means of a sawtooth modulation applied to the helix of TWT 23. This process is called TTM (Transit Time Modulation) or serrodyning.

The delayed and gated 4 to 7 GHz signal output from microwave amplifier 25 is applied to mixer set 8 of the front end 5 during retransmission. The 4 to 7 GHz spectral components are combined in the directional filter mixers with the VCO set at a frequency between 4 and 7 GHz corresponding to a frequency determined by the received input signal. This combined signal beats with the 1–2 GHz LO signals supplied via computer controlled gates 10. The original input signal is thus reproduced together with frequencies cataloged by the computer and all intermediate frequencies arising from the beating process. The overall intent of the VCO's is to reconstitute the spectral components of the frequencies transmitted by the hostile radar (e.g., with frequency diversity) so that valid RF pulses may be produced at earlier and later ranges than the target pulses. Computer 3 and microprocessor 184 contribute to this end by using the PWs and the minimum and maximum PRIs (updated from previous scans) to control the recycling switch 180 and IF gate 182.

The resultant signal from tuned mixer set 8 is a reconstituted facsimile of the original radar signal that is produced both earlier and later with correct RF frequencies and corrected for a predetermined doppler shift. The signal is then passed through duplexer 6 to the CFAs 4a and 4b which provide nominal power gains of 15 dB. As directed by the computer program, the amplified RF signals are then repeated from antenna 1.

Figure 2B:
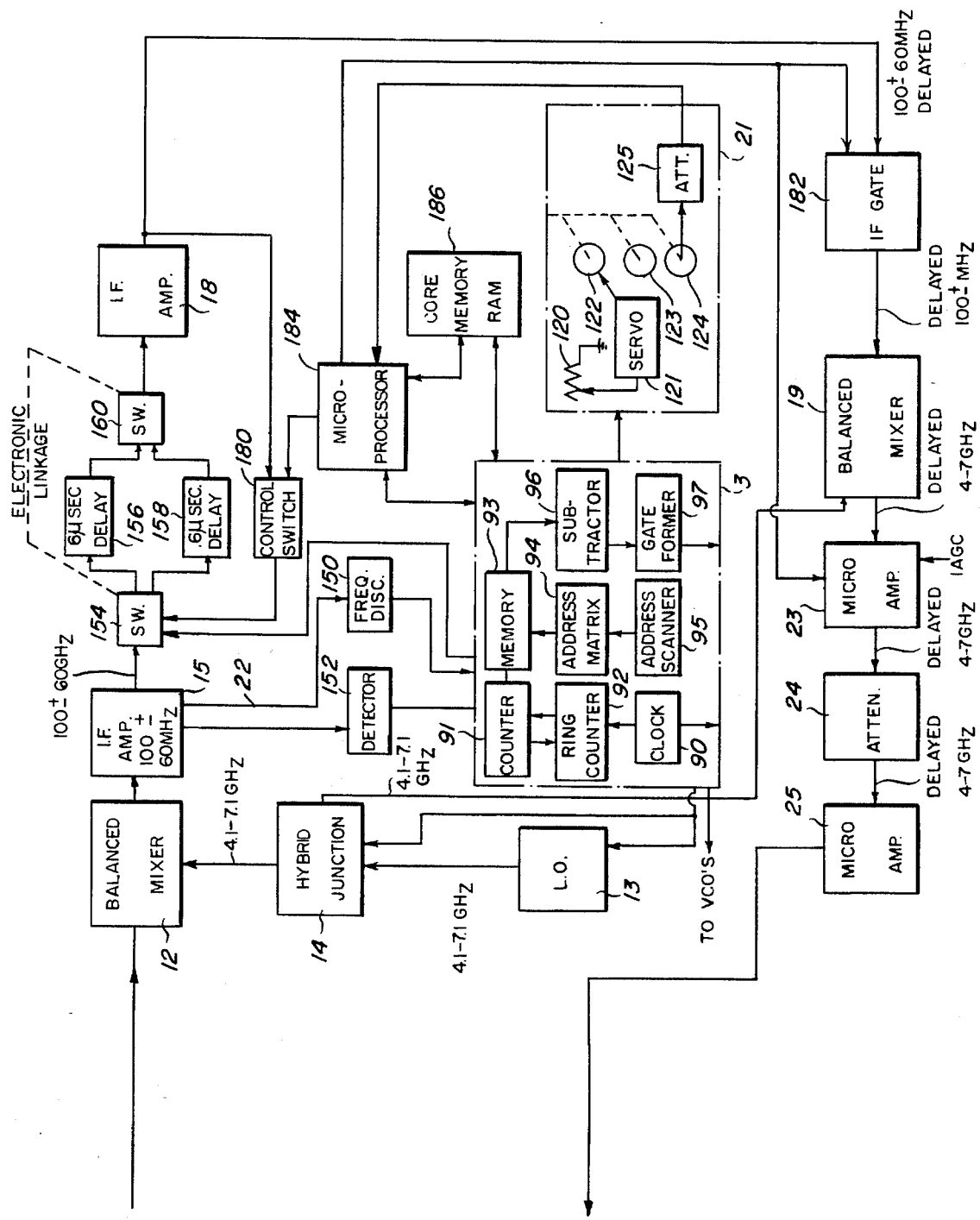

Referring now to FIGS. 2A and 2B, the duplexer 6 of the microwave front end includes a filter diplexer 40 that separates the incoming signal into two or more paths (specifically, those including the bands 2–4 GHz and 4–9 GHz in the described embodiment). The operation of each band path is substantially identical. The duplexer 6 includes circulators 41 and 42 associated with the respective bands. The 2–4 GHz range signals from the filter diplexer 40 are applied, via circulator 41 and nanosecond switch 43, to TWT amplifier 190, and then to the input directional filter manifold 44 having a termination 45. The filter manifold conveys the signal to a plurality of directional filter mixers 46–49 which serve as tuning elements and mixers to separate the signal into discrete overlapping narrow band channels. If needed, ancillary equipment may be provided to afford adjustability and frequency control (e.g., with VCO's)as desired. Similarly, the 4–9 GHz range signals from filter diplexer 40 are applied, via circulator 42 and nanosecond switch 53, to TWT amplifier 192, and then to the input directional filter manifold 54 having a termination 55. The switching operations of switches 43 and 53 during both reception and repeating periods are controlled by computer 3. During reception, switches 43 and 53 and the diode switch associated with the output 110 of oscillator gate 10 are closed while the diode switches associated with gates 101–109 are open. During repeating, switches 43 and 53 and gate switch 110 are open, while gate switches 101–109 are closed as determined by the computer program. The switches 43 and 53 are solid state avalanche diodes and can therefore provide nanosecond operation.

Thus, in the reception period, for a signal in the 2–4 GHz range, the local oscillator signal band (1–2 GHz) is fed to all tuned mixer elements in such a manner that mixer outputs are produced only in those elements that are tuned to the radar input signal. The mixer output signal, which consists of the sum and difference products, is routed via waveguide or stripline channels (with suitable interfacing joints, if desired) to the output directional filter manifold 60 having a termination 61. The signal passes through directional filter 62 which filters out spectral components in the range of 4–7 GHz. Filter 62 is designed with proper bandpass or band rejection skirts to channel out only 4–7 GHz components. The spectral output is now passed through filter diplexer 63 to balanced mixer 12.

In a similar manner, a signal in the 4–9 GHz range is processed from circulator 42 via switch 53 to TWT amplifier 192, and then to the input directional filter manifold 54. The signal is applied to one or more of the directional filter mixers 66, 67, 68, 69 or 70 (in accordance with signal frequency) and is mixed with the 1–2 GHz local oscillator signal gated via diode switch gate 110. The resulting mixer output signal is then routed via waveguide or stripline channels to the output directional filter manifold 72 having a termination 73. The signal is filtered through directional filter 74 which passes the 4–7 GHz spectral components to balanced mixer 12 via diplexer 63.

The tuning ranges of the directional filter-mixers are as follows:

|  | During Reception | During Transmission |  |
|---|---|---|---|
| filter-mixer | 46 | 134 | 2.0–2.5 GHz |
| filter-mixer | 47 | 135 | 2.5–3.0 GHz |
| filter-mixer | 48 | 136 | 3.0–3.5 GHz |
| filter-mixer | 49 | 137 | 3.5–4.0 GHz |
| filter-mixer | 66 | 138 | 4.0–5.0 GHz |
| filter-mixer | 67 | 139 | 5.0–6.0 GHz |
| filter-mixer | 68 | 140 | 6.0–7.0 GHz |
| filter-mixer | 69 | 141 | 7.0–8.0 GHz |
| filter-mixer | 70 | 142 | 8.0–9.0 GHz |

Thus the signal supplied to balanced mixer 12 contains 4–7 GHz spectral components representative of the radar signal in the range 2–9 GHz. As noted before, it is converted in balanced mixer 12 with the LO 4.1–7.1 GHz signal supplied via hybrid junction 14 as programmed by computer 3. The resulting signal is amplified by IF amplifier 15 with a passband of 100±60 MHz. and is then routed to frequency discriminator 150, to detector 152, and to switch 154.

Discriminator 150 provides the reference frequency for computer 3 during the first scan of the RF scenario as previously described. Detector 152 supplies the PW and PRI to the computer. Switch 154 is controlled by computer 3 according to the pulse width and switches the IF output to delay line 156 or 158 depending on the PW. Delay line 156 is switched in for PW greater than 0.5 microsecond. Delay line 158 is switched in for PW less than 0.5 microsecond. The intent of delay line use is to prevent overlapping of repeated pulses. In particular, tracking PWs are generally 0.5 microsecond or less and should provide a spacing of 0.1 microseconds between repeated pulses.

To provide a fuller understanding of the data processing part of the system, the interaction between the typical RF scenario and the data processing operations will now be described. At the time of first interception, six pulses are assumed above the receiver apparatus threshold. Computer 3 receives six detected pulses from detector 152 and six discriminator pulses from discriminator 150. Six scans will be considered and no retransmissions will be made during the first scan. The first pulse of the first scan initially sets the reference frequency in computer 3 from discriminator 150, supplies azimuth to computer 3, and serves to catalog PRI and PW through detector 152. Delay line 156 or 158 is selected by computer 3 in accordance with the PW. Computer 3 also selects the reference VCO 201–209 in microwave front end 5.

The second pulse accounts for any change in frequency as determined by discriminator 150 and computer 3 which then selects a new VCO if there is a specified in-band frequency change; otherwise the VCO is unchanged. PRI and PW are catalogued through detector 152.

The third pulse repeats the check on PRI, frequency, VCO, and PW. The fourth pulse repeats like the third, the fifth pulse repeats like the fourth, and the sixth pulse repeats like the fifth.

During the second scan of five pulses, the data processing for each pulse is repeated as for the first scan and retransmission is started. The third, fourth, fifth and sixth scans process the data from each pulse, and retranmission takes place as for the second scan.

After one minute, the computer checks all its storage registers for data updates. If no update was completed in sixty seconds, storage registers are made available for other computer uses as for the first scan.

Computer 3 programs the microprocessor 184 to activate IF gate 182 to repeat (earlier or later or both) the delayed IF pulses from IF amplifier 18. Microprocessor 184 uses the PWs and the minimum and maximum PRIs (updated from previous scans) to control the recycling switch 180. Core memory 186 supplies microprocessor 184 with data (e.g., PRI, PW, azimuth angle, "jammer" jitter) for pulse retransmission. Doppler correction means 21 inputs data to microprocessor 184 for doppler frequency shift of the repeated pulses.

The computer 3 performs three district functions by means of its own structure (components and configuration) together with reciprocal operations between microprocessor 184, core memory (RAM) 186, and computer 3. First, computer 3 stores information on PRF, PW, and VCO frequency in its memory storage section and in core memory 186. Secondly, it controls the timing of all system functions, such as starting, stopping, and switching. Finally, it processes PRF information (whether periodic or jittered). The storage and timing functions are accomplished in a conventional manner between computer 3 and subsystems 184 and 186, and need not be described in greater detail. For the processing of the pulse repetition rate frequency, however, novel means are provided for utilizing the difference in time between consecutive pulses to determine a gate width which will cause certain pulses to be repeated at such a time that the hostile radar is deceived (that is to cause the radar to accept the pulse as one of its own reflected signals). Thus, the computer clock 90 times all units of the computer at a given rate (for example, at a one megahertz rate). Thus, the signal supplied to computer 3 from the intermediate frequency amplifier 15 via conductor 22 starts a counter 91 which is mated by ring counter 92 operating at a nominal rate of two megahertz. The counter 91 resets ring counter 92 which shifts from mate 1 to gate 2 and so forth to gate n. The outputs on lines 1, 2 . . . n (corresponding to the gates) are committed to the memory 93. Words $t_1, t_2, \ldots t_n$ are called from memory 93 by the address matrix 94 when actuated by the address scanner 95. The address scanner is essentially an addition unit which gates the lines 1, 2 . . . n from the memory so that words $t_1, t_2 \ldots t_n$ will be allowed through subtractor 96. The subtractor puts out differences $\Delta t_1, \Delta t_2 \ldots \Delta t_n$ between consecutive pulse intervals into gate former 97 which forms one more pulse than the word. Thus a zero time difference produces one pulse, one unit time difference produces two pulses, two units produces three pulses, and so forth. These pulse outputs from the gate former turn on the CFAs 4a and 4b which repeat the RF signal in these several pulses so that the hostile radar selects only its own RF pulse signal and throws out all other pulses. In this manner, it is possible to repeat effectively against radars with irregular PRFs—e. g., chirp and/or staggered, jittered, random, coded signals and the like.

A rate of change of delay to represent the range rate of the repeated echo is produced by doppler correcting means 21 which operates as follows. The variable speed drive 120 is set for the airborne or spaceborne vehicle in which it is installed. The drive output feeds servo amplifier 121 that drives motor 122. The motor, which is calibrated in terms of equivalent feet of delay line, is mechanically linked with generator 123, and differential generator 124. As part of the servo loop, the generator smooths out variations in motor speed (whereby the speed is maintained constant) such that the rate of change of the variable speed drive is a true equivalent of the input speed information (i.e., the range rate). Differential generator 124 transforms the rate of change of the drive into a doppler voltage which is passed through attenuator 125 to microprocessor 184 and then to microwave amplifier 23 (specifically, to the helix of a travelling wave tube). This results in a phase change of the delayed radio frequency signal that is correlated with the desired speed of the vehicle at all times.

The operation of the data processing part of the invention has been described in detail with respect to nanosecond switches 154 and 160, delay lines 156 and 158, IF amplifiers 15 and 18, frequency discriminator 150, detector 152, control switch 180, microprocessor 184, core memory 186, IF gate 182, computer 3, and doppler correction means 21.

The delayed IF at 100±60 MHz is mixed in balanced mixer 19 with the 4.1–7.1 GHz LO signal band generated by LO 13 and gated by hybrid Junction 14. This reconversion produces delayed spectral components which are attenuated in attenuator 24 and further amplified in microwave amplifier 25.

The delayed signal is routed via filter diplexer 127 to directional filters 128 and 129 which filter out the 4–7 GHz spectral components. This signal appears in input directional filter manifolds 130 and 131 having terminations 132 and 133, respectively. The signal is routed to directional filter mixers 134–137 in the 2–4 GHz path and to directional filter mixers 138–142 in the 4–9 GHz path. Then one or more of the filter-mixer units will be activated with the local oscillator band 1–2 GHz signal depending on those avalanche diode switch gates 101–109 which have been selected by the computer 3. The 4–7 GHz spectral components in the directional filter mixers are combined with that one of the VCO's 201–209 (under computer control) set at a frequency between 4 and 7 GHz corresponding to a frequency determined by the RF received input signal. The original input signal is then reproduced with frequencies cataloged by the computer and all intermediate frequencies arising from the beating process. The resulting mixer output from the activated unit represents a reconstituted facsimile of the original radar signal delayed in time (retransmitted earlier or later or both with correct RF frequencies) and corrected for a predetermined doppler shift. The signal (or signals) are then routed, via the output directional filter manifolds 143 and 144 with termination 145 and 146, respectively, to circulators 41 and 42 and to filter diplexer 40. In accordance with the computer program, the delayed and doppler-corrected signal is amplified in amplifier 4a or 4b which may be modulated with additional pulse gates as previously described. The signal is now repeated and beamed via wide band antenna 1 to a selected location or radar site.

It is apparent that the system of the present invention constitutes a wide-band, multi-spectral component mixer, duplexer system with computer and microprocessor program control of storage timing, frequency and phase. The system repeats signals earlier or later or both with the correct doppler frequency and, when feasible, will repeat also at a false angle.

The RF and data processing may be performed on 100 or more radars depending on computer capacity, microprocessors, and systems factors. The system performs satisfactorily even for sophisticated radars using frequency diversity, frequency jumping, monopulse tracking, pulse compression (chirp), and/or random, jittered, staggered, coded PRF, and so forth.

Glossary of Applicable Terms dB=decibel (s)

dBm=decibels above 1 milliwatt dBw=decibels above 1 watt

Hz=Hertz (same as cycles per sec or cps)

kHz=kilohertz

MHz=megahertz

GHz=gigahertz
IF=intermediate frequency
RF=radio and radar frequencies
PW=pulse width
PRI=pulse rate interval
PRF=pulse repetition frequency
CW=continuous wave(s)
LO=local oscillator
KW=kilowatt
VCO=voltage controlled oscillator
IAGC=instantaneous gain control
TWT=traveling wave tube
ELINT=electronic intelligence
ECM=electronic countermeasures
ECCM=electronic counter-countermeasures While in accordance with the provisions of the Patent Statutes, the preferred form and embodiment of the invention has been illustrated and described, it will be apparent to those skilled in the art that various changes and modifications may be made in the apparatus described without deviating from the concepts set forth above.

What is claimed is:

1. Apparatus for processing radar signals and the like, comprising
   (a) antenna means (1) for receiving and transmitting wideband signals;
   (b) microwave front end means (5) including
      (1) a pair of tuned mixers (7,8) each including
         (a) a set of receiving directional filter units (46–49; 66–70);
         (b) a set of transmitting directional filter mixers (134–137; 138–142); and
         (c) a plurality of directional filters (62,74,128,129) connected with said sets of receiving and transmitting directional filter mixers, respectively;
      (2) a receiver filter diplexer (63) having a pair of input terminals connected with the sets of receiver directional filter mixers, respectively, said receiver filter diplexer also having an output terminal;
      (3) a transmitter filter diplexer (127) having a pair of output terminals connected with the sets of transmitter directional filter mixers, respectively, said transmitter filter diplexer also having an input terminal; and
      (4) duplexer means (6) for alternately connecting said antenna means with said tuned mixers, respectively, said duplexer means including a filter diplexer (40), and a pair of circulators (41,42) associated with said tuned mixers, respectively;
   (c) first gate means (10) for supplying first local oscillator signals to said directional filter mixers, respectively;
   (d) first mixer means (12) including a first input connected with the output terminal of said receiver filter diplexer, said mixer means having a second input connected with second local oscillator means (13), said mixer means including an output;
   (e) second mixer means (19) having an output connected with the input of the transmitter filter diplexer (127), said second mixer means including a first input terminal connected with the second local oscillator means (13), and a second input;
   (f) signal delay means (156,158) having an input connected with the output of said first mixer means, said signal delay means having an output;
   (g) second gate means (182) connecting the output of said delay means with the second input of said second mixer means; and
   (h) means including a computer (3), doppler correcting means (21) and a microprocessor (184) for controlling the operation of said second gate means to supply a delayed signal to said second mixer means.

2. Apparatus as defined in claim 1, and further including a plurality of voltage controlled oscillator means (201–209) connected with said directional filter mixers (134–137; 138–142), respectively, said voltage controlled oscillator means being selectively operable by said computer.

3. Apparatus as defined in claim 1, wherein said signal delay means includes
   (1) a plurality of delay circuits (156,158) having different effective delay times, respectively;
   (2) first amplifier means (15) having an input connected with the output of said first mixer means (12), said first amplifier means also having first, second and third outputs;
   (3) second amplifier means (18) having an output connected with the input of said second gate means; and
   (4) switch means (154,160) operable by said computer for selectively connecting said delay circuits between the first output of said first amplifier means and the input of said second amplifier means, respectively.

4. Apparatus as defined in claim 3, wherein said delay means further includes
   (5) pulse width and pulse rate interval detector means (152) connecting the second output of said first amplifier means with said computer;
   (6) frequency discriminator means (150) connecting the third output of said first amplifier means with said computer, thereby to provide a signal reference frequency to the computer; and
   (7) control switch means (180) having an input terminal connected with the output of said second amplifier means and an output connected with the input of said switch means, said control switch means being selectively operable by said microprocessor.

5. Apparatus as defined in claim 1, and further including a pair of crossed field amplifiers (4a, 4b) connected in parallel between said antenna means and the input to said front end means, said crossed field amplifiers having different frequency ranges and being selectively operable by said computer, respectively.

* * * * *